United States Patent
Königshofen et al.

(10) Patent No.: US 12,540,404 B2
(45) Date of Patent: Feb. 3, 2026

(54) METHOD FOR IMPROVING ADHESION BETWEEN METALLIZATION LAYERS AND OZONE-ETCHED PLASTICS

(71) Applicant: MacDermid Enthone Inc., Waterbury, CT (US)

(72) Inventors: Andreas Königshofen, Leverkusen (DE); Almedina Fetahovic, Waterbury, CT (US); Stefan Schäfer, Solingen (DE)

(73) Assignee: MacDermid Enthone Inc., Waterbury, CT (US)

( * ) Notice: Subject to any disclaimer, the term of this patent is extended or adjusted under 35 U.S.C. 154(b) by 88 days.

(21) Appl. No.: 18/390,072

(22) Filed: Dec. 20, 2023

(65) Prior Publication Data

US 2025/0207264 A1    Jun. 26, 2025

(51) Int. Cl.
| | |
|---|---|
| *C23C 28/02* | (2006.01) |
| *C08J 7/043* | (2020.01) |
| *C08J 7/14* | (2006.01) |
| *C23C 18/54* | (2006.01) |
| *C25D 5/50* | (2006.01) |
| *C25D 5/56* | (2006.01) |

(52) U.S. Cl.
CPC ............. *C23C 28/023* (2013.01); *C08J 7/043* (2020.01); *C08J 7/14* (2013.01); *C23C 18/54* (2013.01); *C25D 5/50* (2013.01); *C25D 5/56* (2013.01); *C08J 2355/02* (2013.01)

(58) Field of Classification Search
CPC ........ C23C 28/023; C23C 18/54; C08J 7/043; C08J 7/14
See application file for complete search history.

(56) References Cited

U.S. PATENT DOCUMENTS

| | | |
|---|---|---|
| 4,592,852 A | 6/1986 | Courduvelis et al. |
| 2020/0181787 A1 | 6/2020 | Scheybal et al. |

FOREIGN PATENT DOCUMENTS

| | | | |
|---|---|---|---|
| WO | 2022136377 A1 | | 6/2022 |
| WO | WO2022136377 | * | 6/2022 |

* cited by examiner

*Primary Examiner* — Nathan T Leong
(74) *Attorney, Agent, or Firm* — Carmody Torrance Sandak & Hennessey LLP

(57) ABSTRACT

A method of metallizing plastic parts, the method comprising the steps of: (a) etching a plastic part, by introducing the plastic part into an aqueous, acidic ozone etching solution, (b) metallizing the ozone etched, plastic part, and (c) heating the metallized part in an oven at an elevated temperature for a period of time. The ozone-etched and metallized plastic part after being heated in the oven exhibits increased peel strength and improved adhesion.

20 Claims, 2 Drawing Sheets

METHOD FOR IMPROVING ADHESION BETWEEN METALLIZATION LAYERS AND OZONE-ETCHED PLASTICS

FIELD OF THE INVENTION

The present invention relates generally to methods of improving adhesion between plastic parts and metallization layers applied thereon.

BACKGROUND OF INVENTION

It is well known in the art to plate non-conductive parts, (i.e. plastics) with metal for a variety of purposes. Plastic mouldings are relatively inexpensive to produce and metal plated plastic parts are used for many applications. For example, metal plated plastics are used for decoration and for the fabrication of electronic devices. An example of a decorative use includes automobile parts such as trim. Examples of electronic uses include printed circuits, wherein metal plated in a selective pattern comprises the conductors of the printed circuit board, and metal plated plastics used for EMI shielding. ABS resins are one of the most commonly plated plastics for decorative purposes while phenolic and epoxy resins are the most commonly plated plastics for the fabrication of printed circuit boards.

Preparing plastics for subsequent plating is a multistep process and typical process steps include:
1) etching the part;
2) neutralizing the etched surface with a neutralizing solution;
3) activating the etched surface;
4) an accelerating step; and
5) depositing one or more layers of electroless metal, such as electroless copper and/or electroless nickel, followed by electrolytic deposition of one or more metal layers such as copper and/or nickel.

The etching step introduces microroughness on the surface of the part in order to provide mechanical adhesion of the subsequent metallic coatings and to provide a suitable surface for adsorption of a catalytic layer (commonly palladium, applied by immersion in a solution of colloidal palladium particles). The catalyst is applied in order to catalyse deposition of the initial metallic layer from an autocatalytic plating bath such as a nickel or copper containing plating bath. Following this, additional metal layers including, for example, one or more of copper, nickel and/or chromium, are applied by electroplating.

For the durability of the metal layers deposited on the plastic parts and surfaces, it is essential that a high level of adhesion of the metal layer(s) on the plastic part is achieved. In order to produce plastic parts having firmly bonded metal coatings thereon, it is customary to treat the plastic part prior to metal deposition, which typically requires an etching step. The plastic parts are typically subjected to the etching/pretreatment step during which the surfaces of the plastic parts are treated to increase adhesion characteristics of metal layers subsequently deposited thereon.

For example, the plastic parts can be chemically etched to create pores on the surface of the plastic parts which roughens the surface. The etching step introduces microroughness on the part surface in order to provide mechanical adhesion of the subsequent metallic coatings and to provide a suitable surface for adsorption of a catalytic layer (commonly palladium, applied by immersion in a solution of colloidal palladium particles). The catalyst is applied in order to catalyse the deposition of the initial metallic layer from an autocatalytic nickel or copper plating process.

The resulting pores serve as anchoring for the later deposited metal layer(s) and it is assumed that the adhesion of the deposited metal layer is caused by this anchoring effect. In addition, partial oxidation of the polymer chains of the plastic parts can also lead to a functionalization of the plastic parts, which leads to a chemical and/or physical interaction (e.g., through the formation of covalent or ionic bonds or through van der Waals forces) with the deposited metal layer and thereby causes the adhesion between the two phases.

Etching is understood to mean a change in the chemical and physical properties of surfaces of plastic parts treated with the etching solution, which also removes stains and inorganic contaminants. In addition to surface changes, these changes include (1) chemical attack or dissolution of the plastic articles, (2) the functionalization of the plastic surface, i.e., by introducing hydroxide or carboxylate groups and the associated change in the polarity of the plastic surface, and (3) the change in the physical properties of the treated plastic surfaces with regard to charge distribution, the polymer structure or surface structuring.

In one typical process, plastic parts are treated with an etching solution containing sulfuric acid and chromium(VI). It is assumed that the pores on the surface of the plastic parts are created when the plastic part is brought into contact with the chromium-sulfuric acid etching agent because unsaturated hydrocarbons on the plastic surface are attacked. However, it is also likely that the surface is also attacked due to the oxidizing effect.

Compounds containing chromium(VI) are suspected of being carcinogenic, and due to their classification as Substances of Very High Concern according to the Regulation on the Registration, Evaluation, Authorization and Restriction of Chemicals (REACH) in the European Union, the use of acidic chromium (VI)-containing etching solutions is only permitted with a special permit. A complete ban on the commercial use of chromium (VI)-containing compounds is also possible due to the hazard potential emanating from chromium (VI)-releasing compounds.

Alternatives to chromium (VI)-containing etching solutions for plastic parts include, for example, etching solutions based on permanganates, including etching solutions based on alkali metal permanganates, including potassium permanganate, and a mineral acid, such as phosphoric acid. These etching solutions show a good etching effect for plastic surfaces, but the alkali permanganate used in the solution is subject to rapid self-decomposition, so that the etching effect of an alkali permanganate etching solution is no longer sufficient after just a few hours. In addition, manganese dioxide can be undesirably deposited on the plastic surfaces, which has a negative effect on the further coating process.

U.S. Pat. No. 5,160,600 to Patel et al., the subject matter of which is herein incorporated by reference in its entirety, describes a process for the electroless plating of plastics which is carried out in an environment free of chromium ions, by the sequential steps of roughening and activating the surface of the plastic by contact with an aqueous solution of concentrated sulfur acid, of concentrated nitric acid, or of concentrated phosphoric acid, in the presence of noble metal ion and an oxidant selected from the group consisting of nitric acid, hydrogen peroxide and persulfates followed by an aqueous suspension of $Pd^0$ and then chemical metallization.

EP3414364 to Biconex GmbH, the subject matter of which is herein incorporated by reference in its entirety, describes a method for pre-treating surfaces of plastic parts for metallization, such as by galvanic plating, by contacting the parts with an oxidant, such as a peroxy compound. The plastic parts may be contacted with a non-dehydrating peroxy compound including ozone. However, peroxide-etched plastic parts often have low peel strength values. Therefore, in order to achieve a higher desired peel strength, a special heat treatment step is often performed, which often takes days to achieve a good result.

WO2022136377 to Delta Engineering & Chemistry GmbH, the subject matter of which is herein incorporated by reference in its entirety, describes a method for etching plastic parts using ozone. The etched plastic parts are subjected to post-treatment to remove ozone which involves bringing the etched plastic part into contact with a basic post-treatment solution that contains ammonia. While the post-treatment step is known to provide a positive influence on the process of metallizing plastic parts, the peel strength values after post-treatment are still relatively low.

Thus, there is a need in the art for an improved method of preparing plastic parts to accept metal plating thereon, including an improved method of treating ozone-etched plastic parts that increases the adhesion of the metallization layer to the underlying plastic surface and that exhibits improved peel strength.

SUMMARY OF THE INVENTION

It is an object of the present invention to provide an improved method of preparing plastic parts to accept metal plating thereon.

It is another object of the present invention to provide an improved method of preparing plastic parts to accept metal plating thereon that includes a post-treatment step to improve the adhesion of the metallization layer on the plastic parts.

It is another object of the present invention to improve the peel strength of metallized plastic parts.

It is still another object of the present invention to improve the peel strength of metallized plastic parts that include two or more different types of plastics situated adjacent to each other.

To that end, in one embodiment, the present invention relates generally to a method of metallizing plastic parts, the method comprising the steps of:
  a. etching a plastic part by introducing the plastic part into an aqueous, acidic ozone etching solution,
  b. metallizing the ozone-etched, plastic part, and
  c. heating the ozone-etched and metallized plastic part in an oven at an elevated temperature for a period of time.

DETAILED DESCRIPTION

Figure 1:
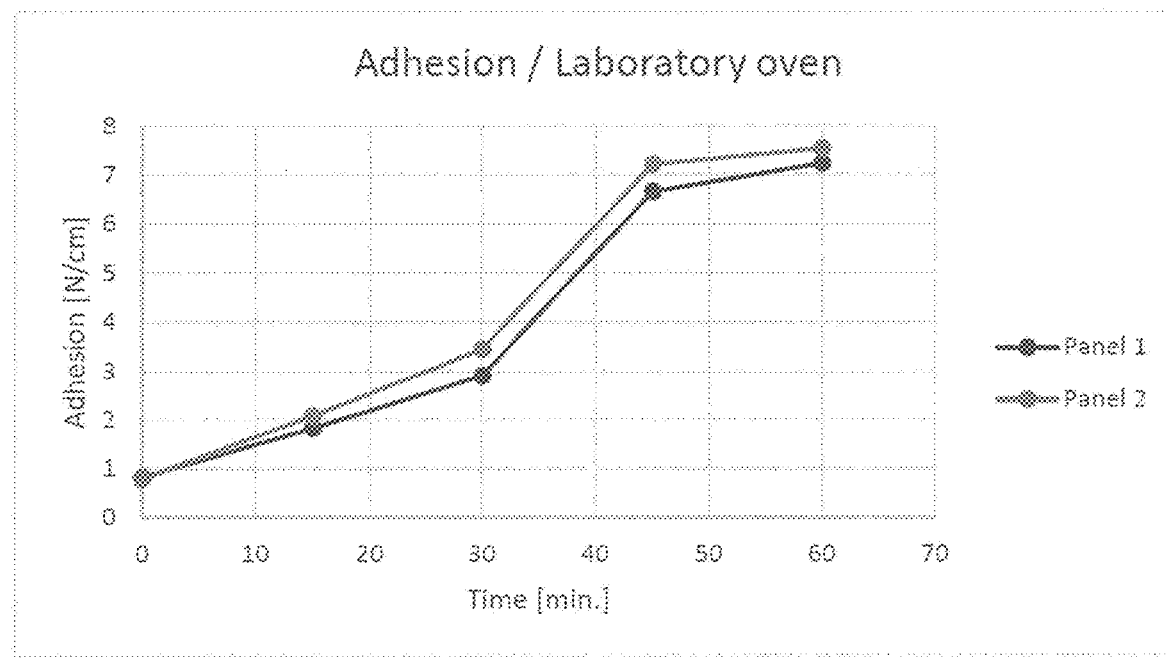
FIG. 1 depicts a graph of the adhesion strength of ABS panels using different drying times at a defined temperature in a laboratory oven.

The present invention relates generally to a method for subjecting an ozone-etched plastic part after metallization to a drying oven for a period of time to increase adhesion. The inventors of the present invention surprisingly discovered that drying an ozone-etched and metallized plastic part in a drying oven subsequent to the metallization step at a defined temperature and for a defined period of time can increase the peel strength by at least three times or at least four times or at least five times, or more, compared to the initial peel strength without heating.

In one embodiment, the ozone-etched plastic part is heated to an elevated temperature after metallization for a period of time to achieve a peel strength of at least about 5.0 N/cm or at least about 5.5 N/cm, or at least about 6.0 N/cm, or at least about 6.5 N/cm, or at least about 7.0 N/cm, or at least about 7.5 N/cm, or at least about 8.0 N/cm, or at least about 8.5 N/cm, or at least about 9.0 N/cm, or at least about 9.5 N/cm, or at least about 10 N/cm in accordance with ASTM Test Method B533-85 (Reapproved 2019), Procedure A, which is herein incorporated by reference in its entirety.

In another embodiment, the ozone-etched plastic part is heated after metallization in an oven maintained at a temperature in the range of about 60 to about 90° C., more preferably about 65 to about 85° C., more preferably about 70 to about 80° C., more preferably about 75 to about 78° C. for between about 10 and about 120 minutes, preferably between about 15 and about 90 minutes, preferably between about 20 and about 75 minutes more preferably between about 30 and about 60 minutes to achieve a peel strength of at least about 5.0 N/cm or at least about 5.5 N/cm, or at least about 6.0 N/cm, or at least about 6.5 N/cm, or at least about 7.0 N/cm, or at least about 7.5 N/cm, or at least about 8.0 N/cm, or at least about 8.5 N/cm, or at least about 9.0 N/cm, or at least about 9.5 N/cm, or at least about 10 N/cm in accordance with ASTM Test Method B533-85 (Reapproved 2019) Procedure A.

As used herein. "a," "an," and "the" refer to both singular and plural referents unless the context clearly dictates otherwise.

As used herein, the term "about" refers to a measurable value such as a parameter, an amount, a temporal duration, and the like and is meant to include variations of +/−15% or less, preferably variations of +/−10% or less, more preferably variations of +/−5% or less, even more preferably variations of +/−1% or less, and still more preferably variations of +/−0.1% or less of and from the particularly recited value, in so far as such variations are appropriate to perform in the invention described herein. Furthermore, it is also to be understood that the value to which the modifier "about" refers is itself specifically disclosed herein.

As used herein, spatially relative terms, such as "beneath," "below," "lower," "above," "upper," and the like, are used for ease of descriptions to describe one element or feature's relationship to another element(s) or feature(s) as illustrated in the figures. It is further understood that the terms "front" and "back" are not intended to be limiting and are intended to be interchangeable where appropriate.

As used herein, the terms "comprises" and/or "comprising" specify the presence of stated features, integers, steps, operations, elements, and/or components, but do not preclude the presence or addition of one or more other features, integers, steps, operations, elements, components, and/or groups thereof.

As used herein, the term "substantially-free" or "essentially-free," if not otherwise defined herein for a particular element or compound, means that a given element or compound is not detectable by ordinary analytical means that are well known to those skilled in the art of metal plating for bath analysis. Such methods typically include atomic absorption spectrometry, titration, UV-Vis analysis, secondary ion mass spectrometry, and other commonly available analytical methods.

In one embodiment, and as described herein, the present invention relates generally to a method of metallizing plastic parts, the method comprising the steps of:
 a. etching a plastic part by introducing the plastic part into an aqueous, acidic ozone etching solution,
 b. metallizing the ozone-etched, plastic part, and
 c. heating the ozone-etched and metallized plastic part in an oven at an elevated temperature for a period of time.

Plastic parts may be ozone-etched using various methods, including the method described in WO2022/136377, the contents of which are incorporated herein by reference in its entirety.

Gaseous ozone is introduced into the aqueous, acidic solution to provide the aqueous, acidic ozone etching solution. Ozone may be produced from oxygen using high-voltage discharge, which creates an ozone-oxygen gas mixture. The ozone may also be produced using an ozone generator, and method for producing ozone using an ozone generator are known to those skilled in the art.

The ozone-oxygen gas mixture produced is introduced into the aqueous, acidic solution, preferably under pressure. The gas mixture is distributed in the water, for example with the help of a static mixer and the ozone dissolves in the aqueous, acidic solution to form the aqueous, acidic ozone etching solution.

The aqueous, acidic ozone etching solution may comprise one or more acids, which one or more acids are preferably selected from the group consisting of sulfuric acid, phosphoric acid, acetic acid, hydrofluoric acid, sulfonic acid, phosphonic acid, toluenesulfonic acid, citric acid, and mixtures thereof. In one embodiment, the aqueous, acidic ozone etching solution comprises one or more acids selected from the group consisting of sulfuric acid, phosphoric acid, and mixtures thereof.

In one embodiment, the pH of the aqueous, acidic ozone etching solution is preferably less than about 6.5, more preferably less than about 4.5, and even more preferably less than about 2.0. In one embodiment, the pH of the aqueous, acidic ozone etching solution is less than about 2.0, more preferably less than about 1.9, more preferably less than about 1.8, more preferably less than about 1.7, more preferably less than about 1.6 and even more preferably less than about 1.5. In one embodiment, the pH of the aqueous, acidic ozone etching solution is between about 0.1 and about 1.9, more preferably between about 0.2 and about 1.8, even more preferably between about 0.3 and about 1.7. In another embodiment, the pH of the aqueous, acidic ozone etching solution is at most about 1.0, preferably less than about 1.0. In another embodiment, the pH of the aqueous, acidic ozone etching solution is between about 1.0 and about 2.0, more preferably between about 1.0 and about 1.9, even more preferably between about 1.0 and about 1.8.

The concentration of the acid in the aqueous, acidic ozone etching solution can be up to about 10.0 mol/L. The concentration of the acid is preferably between about 0.1 mol/L and about 5.5 mol/L. In one embodiment, the concentration of the acid is between about 0.1 mol/L and about 10 mol/L, preferably between about 1 mol/L and about 8 mol/L.

The ozone concentration of the aqueous, acidic ozone etching solution can be in the range of about 2 to about 120 mg/L, or within the range of about 5 mg/L and about 100 mg/L, preferably between about 10 mg/L and about 50 mg/L, preferably between about 20 mg/L and about 50 mg/L, more preferably between about 30 mg/L and about 40 mg/L. In one embodiment, the ozone concentration of the aqueous, acidic ozone etching solution is between about 2 mg/L and about 35 mg/L.

The aqueous, acidic ozone etching solution is also at least substantially free of manganese compounds and is also at least substantially free of chromium compounds.

By at least substantially free of chromium compounds, what is meant is that the content of chromium in the solution is less than 0.20 mmol/L, preferably less than 0.020 mmol/L, more preferably less than 0.002 mmol/L, as measured by atomic absorption spectroscopy (AAS).

Alternatively, the chromium content can also be determined using "optical emission spectroscopy using inductively coupled plasma" (ICP-OES). With both measurement methods, chromium is quantified independently of the oxidation state of the chromium. The total amount of dissolved chromium is determined in each case (total chromium).

By at least substantially free of manganese compounds, what is meant is that the aqueous, acidic ozone etching solution contains less than 0.03 mmol/L manganese, preferably less than 0.01 mmol/L manganese, more preferably less than 0.003 mmol/L, even more preferably less than 0.001 mmol/L, measured as manganese using AAS. Manganese compounds include manganese in oxidation states +1 to +VII, including manganese in the oxidation states +II, +III, +IV, +VI and +VII. Alternatively, the manganese content can also be determined using ICP-OES. With both measuring methods, manganese is quantified independently of the oxidation state of the manganese.

Methods for the quantitative determination of chromium and manganese using AAS and ICP-OES are generally known to those skilled in the art.

In one embodiment, the aqueous, acidic ozone etching solution additionally comprises hydrogen peroxide in a concentration in the range of about 0.001 mol/L and about 0.1 mol/L, preferably in the range of about 0.001 to about 0.05 mol/L, more preferably in a range of about 0.001 mol/L and about 0.02 mol/L. It is assumed that some of the ozone dissolved in the aqueous, acidic ozone etching solution forms hydroxyl radicals together with hydrogen peroxide, and the etching attack occurs not only through ozonolysis of C—C double bonds of the unsaturated carbon hydrogen compounds on the surface of the plastic parts to be etched, but also through attack of the hydroxyl radicals.

Plastic materials treated in the manner described herein can be electroless plated to provide uniformly metal coated plastic surfaces having exceptionally high adhesive properties. In one embodiment, the plastic part to be etched comprises a plastic with unsaturated hydrocarbon compounds. For example, the plastic part may be a plastic selected from the group consisting of acrylonitrile butadiene styrene copolymer (ABS), acrylonitrile butadiene styrene copolymer/polycarbonate (ABS/PC), polycarbonate (PC), polyamide (PA), methacrylic butadiene styrene (MBS), polybutadiene terephthalate (PBT), styrene acrylonitrile copolymer (SAN), polypropylene sulfide (PPS), polyester (PE), polyethylene terephthalate (PET), polyether ether ketone (PEEK), polylactide (PLA), polybutylene succinate (PBS), polylactide/polybutylene succinate (PI-A/PBS), aromatic polymers (LCPs) such as aramids, and combinations of the foregoing. ABS/PC is a mixture of the two plastics ABS and PC. The ABS/PC can contain ABS and PC in different weight ratios. The proportion of ABS in the ABS/PC plastic is preferably between 30 and 60% by weight, more preferably between 35 and 55% by weight, based in each case on the total weight of the ABS/PC plastic. The proportion of PC in the ABS/PC plastic is preferably between 40 and 70% by weight, more preferably between 45 and 65% by weight, based in each case on the total weight of the ABS/PC plastic.

Examples of some commercially available ABS/PC plastics include, but are not limited to, Bayblend® T45 PG, Bayblend® T65 PG, and Bayblend® T65 HI (available from Covestro AG, Leverkusen). Bayblend® T45 PG contains 45% PC and 55% ABS by weight, Bayblend® T65 PG and T65 HI contain 65% PC and 35% ABS by weight. PLA/PBS is a mixture of the two Plastics PLA and PBS. The PLA/PBS can contain PLA and PBS in different weight ratios. In one embodiment, the plastic part to be etched comprises plastics selected from the group consisting of ABS, MBS and ABS/PC, preferably ABS.

The surfaces of any of the above-mentioned plastics are attacked by bringing them into contact with an aqueous, acidic ozone etching solution as described herein and are thereby etched. It is suspected that the ozone will chemically attack the carbon-carbon double bonds of the unsaturated hydrocarbon compounds on the surface of the plastic parts to be etched, causing a bond cleavage (ozonolysis). Surprisingly, the reaction speeds of the bond cleavage caused by the aqueous, acidic ozone etching solution are very different in the aforementioned types of plastic, as well as in the case of copolymers and mixtures of the various plastics. It is therefore possible using the method described herein to selectively pickle both plastic parts comprising only one type of plastic as well as plastic parts comprising two or more different types of plastic situated adjacent to one another. Plastic parts that include two or more different types of plastic situated adjacent to each other are referred to as 2K, 3K or multi-component plastic parts, depending on whether they include two, three or more types of plastic situated adjacent to each other. Selective etching of a single type of plastic of a 2K, 3K or multi-component plastic part can be effected by adjusting the reaction conditions of the etching process, such as temperature, concentration of dissolved ozone in the etching solution, concentration of the acid in the ozone etching solution and etching time. The selectively etched 2K, 3K or multi-component plastic parts can then be selectively coated with one or more metal layers in the metallization step.

In one embodiment, the plastic part to be etched is a 2K, 3K or multi-component plastic part. In one embodiment, the plastic part to be etched is a 2-component plastic part, preferably a 2-component plastic part made from ABS and ABS/PC or from ABS and PC.

For example, a 2-component plastic part made from ABS and ABS/PC, the two plastics ABS and ABS/PC are present side by side. The ABS plastic is the component to be metallized and the ABS/PC plastic is the so-called "selective" component which is selectively not metallized. If the plastic part is subjected to the process according to the steps described herein, only the ABS component is selectively coated in the subsequent metallization and the selective component is not metallized. The edge between the two plastics situated adjacent to each other is also sharply defined in the metallization step.

The plastic part to be etched can contain fillers such as glass fibers, carbon fibers or minerals in addition to the plastic or, in the case of 2K, 3K or multi-component plastic parts, in addition to the at least two or more types of plastic situated adjacent to each other. Such fillers are known to those skilled in the art.

In one embodiment, the method additionally comprises the step of pretreatment of the plastic part to be etched or etched. However, it is noted that a pre-treatment step is not required and the process described herein can be carried out in the absence of a pre-treatment step.

In one embodiment, the pre-treatment of the plastic part to be etched is carried out to clean the plastic surface and activate the plastic surface for the etching attack. In one embodiment, the pretreatment step comprises bringing the plastic part to be etched into contact with an activation solution, which activation is typically an aqueous solution. The plastic part can be brought into contact with the activation solution by various methods, including immersing the plastic part into the activation solution or spraying the activation solution onto surfaces of the plastic parts.

In one embodiment, the activation solution is an acidic activation solution that comprises at least one inorganic acid, such as sulfuric acid, hydrochloric acid or peroxymonosulfuric acid. In another embodiment, the activation solution is a basic activation solution that comprises an inorganic base such as sodium hydroxide or potassium hydroxide. The activation solution can also contain at least one surfactant. In one embodiment, the activation solution comprising the inorganic base can be a solution that is typically used in a degreasing bath. In one embodiment, the basic activation solution comprises ammonia and/or comprises at least one organic, basic compound, which may include, for examples, amines or amides, such as ethylamine, propylamine, tetraethylenepentamine, 1,3-bis(aminomethyl) cyclohexane, pyrimidine, imidazole, oxazole, ethanolamine, propanolamine, diethanolamine, acetamide or hexanamide by way of example and not limitation.

An example of a suitable basic activation solution is a pre-dip solution such as HSO Vortauchlösung KU, available from HSO Herbert Schmidt GmbH & Co KG.

In one embodiment, the method also optionally, but preferably, comprises the step of post-treatment of the etched plastic part, including the removal of ozone remaining on the etched plastic part prior to metallization. If used, the post-treatment step also serves to condition the surface for the subsequent metallization process steps.

In one embodiment, the etched plastic part is brought into contact with a post-treatment solution, such as by immersing the etched part into the post-treatment solution or by spraying the post-treatment solution onto surfaces of the etched plastic part. The post-treatment solution is preferably an aqueous solution, more preferably a basic solution that comprises one or more of sodium hydroxide, potassium hydroxide, ammonia, amines, amides, phosphates and mixtures thereof, more preferably, the post-treatment solution comprises one or more of ethylamine, propylamine, tetraethylenepentamine, 1,3-bis(aminomethyl) cyclohexane, pyrimidine, imidazole, oxazole, ethanolamine, propanolamine, diethanolamine, acetamide, and hexanamide. In one embodiment, the basic post-treatment solution particularly preferably comprises ammonia. The concentration of the aforementioned substances or mixtures thereof in the basic post-treatment solution can be between about 0.01 mol/L and about 5 mol/L, preferably between about 0.05 mol/L and about 1 mol/L. In addition, the basic post-treatment solution preferably contains no anionic and/or nonionic surfactants.

In one embodiment, the temperature of the post-treatment solution, when it is brought into contact with the etched plastic part, is preferably between about 20° C. and about 70° C., preferably between about 30° C. and about 70° C. The etched plastic parts are preferably brought into contact with the post-treatment solution for a period of between about 1 minute and about 60 minutes, preferably between about 3 minutes and about 20 minutes.

In one embodiment, the basic post-treatment solution is aqueous ammonia solution. Surprisingly, it has been shown that the use of an ammonia solution for post-treatment leads to particularly good coating results, and the basic post-treatment solution may comprise ammonia in a concentration of about 0.5 mol/L to about 1.5 mol/L, preferably about 0.7 mol/L to about 1.2 mol/L, more preferably about 1.0 mol/L. The etched plastic parts can be brought into contact with the ammonia solution mentioned for post-treatment. The temperature of the aqueous ammonia solution when it is brought into contact with the etched plastic part is preferably between about 10° C. and about 50° C., more preferably between about 15° C.' and about 45° C., more preferably between about 20° C. and about 40° C., most preferably at about 35° C.

After treatment with the basic post-treatment solution described above, the surfaces of the etched plastic parts are effectively cleaned of oxidation products and ozone remaining on the component is effectively neutralized. As a result, uniform seeding with palladium activator takes place without open areas or other inhomogeneities.

In one embodiment, a basic ammonia post-treatment solution is preferred because it has been observed that the adhesion of the metal coating on a plastic part that is post-treated with an ammonia solution is improved compared to the adhesion of a metal coating on plastic parts that have been treated with other alkaline post-treatment solutions. As well, there is no frame metallization.

Alternatively, the post-treatment solution may be a solution comprising reducing agents such as sodium dithionite, sodium bisulfite, hydroxylammonium sulfate, or may be an aqueous, acidic solution of hydrogen peroxide.

In one embodiment, the etched plastic part may be irradiated with UV light for post-treatment, which removes any ozone remaining on the etched plastic part. If used, the UV light generally has a wavelength of between 240 nm and 320 nm. At wavelengths of less than 240 nm, ozone is formed from oxygen in the air, which should be avoided during follow-up treatment.

It has also been shown that the type of post-treatment has a positive influence on the process of metallizing plastic parts and can have a positive effect on the efficiency of the subsequent metallization of the etched plastic part in the electroless nickel process.

In the method according to the invention, following the step of etching the plastic parts, one or more metal layers are applied to the etched plastic part, which may include one or more galvanic, autocatalytic, electroless and/or electroplating layers as is generally known to those skilled in the art.

In one embodiment, the metallization step includes a first step of contacting the etched plastic part with an activator to deposit metal nuclei on the etched surface. Such methods for applying metal nuclei are generally known to the person skilled in the art and typical metals include, for example, palladium, platinum, silver and/or ruthenium. The activator is typically brought into contact with the etched surface as a colloid. In one embodiment, the activator comprises an aqueous suspension of $Pd^0$ containing between about 0.001 to about 5% w/w thereof.

The activation step is generally followed by electroless metallization with layers of metals or metal alloys, including, but not limited to, nickel, copper, cobalt, copper/nickel, nickel/cobalt or gold layers by reduction from their metal salts. The electroless metallization can then be followed by the coating with further metal layers, including electroplated metal layers, including, for example, one or more of copper, nickel, and/or chrome. In one embodiment, the metallization step includes the electroless deposition of nickel followed by electrolytic nickel followed by electrolytic chromium. In another embodiment, the electroless deposition of nickel is followed by layers of electrolytic copper, electrolytic nickel, and electrolytic chromium.

Thereafter, the metallized and ozone-etched plastic part is transferred to a drying oven. The inventors of the present invention have surprisingly discovered that drying the metallized and ozone-etched plastic for a period of time at an elevated temperature has a profound effect on the adhesion of the metallized coating to the plastic part as evidenced by increased peel strength of metallized and ozone-etched plastic parts that are dried in a drying oven as compared with metallized and ozone-etched plastic parts that are not subjected to post treatment or that are subjected to post treatment by a different method.

In one embodiment, the drying oven is maintained at a temperature within the range of about 40° C. to about 120° C., more preferably at about 50° C. to about 100° C., more preferably at about 60° C. to about 90° C. In one embodiment the temperature of the drying oven is maintained at temperature between about 70° C. and about 80° C. or at a temperature between about 75° C. and about 80° C. or between about 75° C. and about 78° C. or about 70° C. and about 73° C. The ozone-etched and metallized plastic parts are maintained in the drying oven for a period of time. In one embodiment, the period of time is in the range of about 10 minutes to about 120 minutes, preferably between about 30 minutes and about 90 minutes or between about 30 minutes and about 60 minutes or between about 45 minutes and about 60 minutes.

The drying temperature and time will depend in part on the type of plastic being plated and the metal layer or layers applied thereon. What is important is that the drying temperature and drying time are sufficient to increase adhesion of the metallization layers on the ozone-etched plastic part. In one embodiment, the peel strength is greater than about 5 N/cm, or greater than about 6.0 N/cm, or greater than about 6.5 N/cm, or greater than about 7.0 N/cm, or greater than about 7.5 N/cm, or greater than about 8 N/cm, or greater than about 8.5 N/cm, or greater than about 9.0 N/cm, or greater than about 9.5 N/cm, or greater than about 10.0 N/cm in accordance with ASTM Test Method B533-85 (Reapproved 2019), Procedure A. For example, the ozone-etched plastic part after metallization may be heated in an oven having a temperature range of 75-78° C. for 30-60 minutes to achieve a peel strength of greater 7.0 N/cm in accordance with ASTM Test Method B533-85 (Reapproved 2019), Procedure A. In one embodiment, it was found that the use of a drying step in a drying oven at the temperatures and times described herein can increase the peel strength by three time or more, or four times or more, or five time or more, compared to the initial peel strength without heating.

In one embodiment, the method according to the instant invention for metallizing plastic parts includes the steps of:
  Ozone-etching a plastic part;
  Depositing metal nuclei on the etched plastic part from an activator;
  Electroless deposition of a first metal layer;
  Optional deposition of one or more additional metal layers by electroless plating and/or electroplating; and
  Heating in an oven at 40 to 100° C. for 30-90 minutes.

The invention will now be described with reference to the following non-limiting examples. Embodiments provided in the figures and examples are not intended to limit the scope of the invention in any way.

EXAMPLES

Comparative Example 1

An aqueous, acidic ozone etching solution containing 100 ml/L sulfuric acid and 40 mg/l ozone was used to etch the surface of ABS plastic parts that were 2.5 mm thick, 10 cm wide, and 15 cm long following the steps described in WO2022136377.

The ABS plastic panels were subjected to the following steps:

| Step | Time (minutes) | Temperature (° C.) |
| --- | --- | --- |
| Ozone etch | 10 | 45 |
| Rinse with cold tap water | | 20 |
| Neutralization solution (containing ammonia) | 3 | 35 |
| Activation with colloidal Pd activator | 5 | 25 |
| Acceleration in an acidic accelerator solution | 3 | 40 |
| Electroless nickel (commercially available bath containing 3 g/l nickel and 20 g/l sodium hypophosphite) | 8 | 35 |
| Nickel electroplating | 5 | 55 |
| Acid copper electroplating | 50 | 25 |

The electrolytic deposition step following electroless nickel deposition includes a thick nickel electroplating layer followed by acid copper electroplating at a current density of about 4 A/dm$^2$ in a dye-free acid copper electrolyte to a thickness of up to 40 μm.

Thereafter, the metallized ABS plastic parts were exposed to compressed air or dried for 15 minutes at a temperature of 25° C.

The peel strength of the ABS parts was measured in accordance with ASTM Test Method B533-85 (Reapproved 2019), Procedure A. The ABS panels were determined to have a peel strength of less than 1 N/cm.

Example 2

ABS parts were processed according to the steps outlined in Comparative Example 1. Thereafter, all of the parts were placed in a laboratory oven maintained at a constant temperature of 70° C. and were processed for different lengths of time from 15 to 60 minutes as shown in the table below.

The peel strength of the ABS parts was measured in accordance with ASTM Test Method B533-85 (Reapproved 2019), Procedure A. The results are shown in FIG. 1, which is a graph depicting adhesion strength on a 10×15 cm ABS plastic part using different drying times in the laboratory oven.

| | Peel Strength (N/cm$^2$) | |
| --- | --- | --- |
| Time (minutes) | Panel 1 | Panel 2 |
| 15 | 1.83 | 2.08 |
| 30 | 2.9 | 3.45 |
| 45 | 7.22 | 6.66 |
| 60 | 754 | 7.24 |

Example 3

Figure 2:
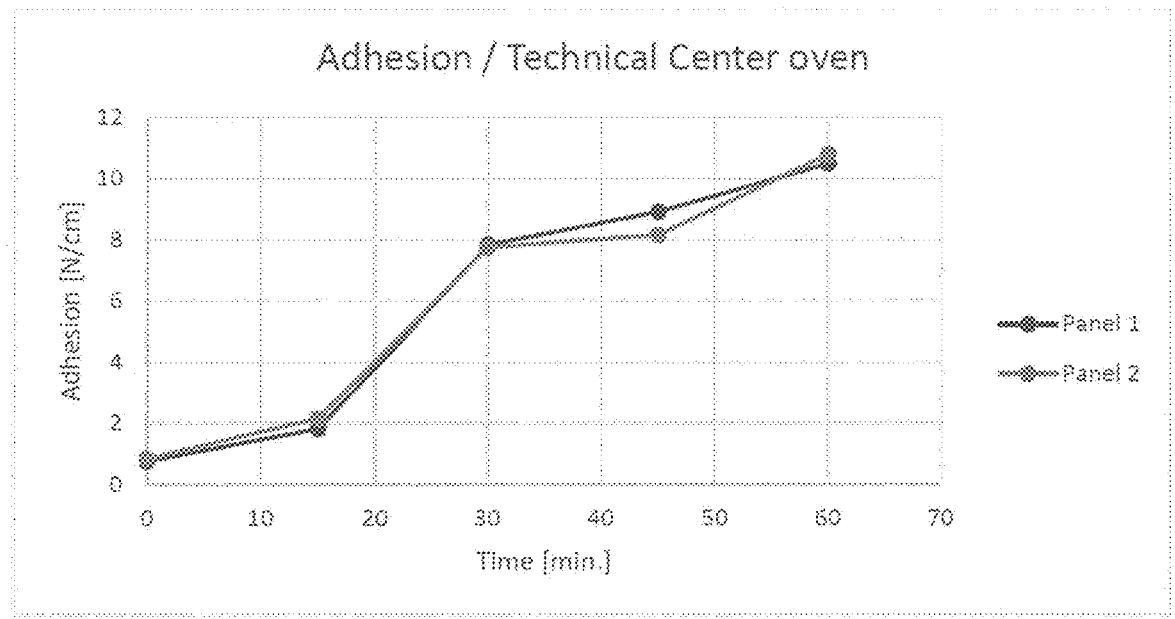
FIG. 2 depicts a graph of the adhesion strength of ABS panels using different drying times at a defined temperature in a technical oven.

ABS parts were processed according to the steps outlined in Comparative Example 1. Thereafter, all of the parts were placed in a technical oven maintained at a temperature in the range of 75-78° C. and were processed for different lengths of time from 15 to 60 minutes as shown in the table below. The results are shown in FIG. 2, which is a graph depicting adhesion strength on a 10×15 cm ABS plastic part using different drying times in the technical oven.

| | Peel Strength (N/cm$^2$) | |
| --- | --- | --- |
| Time (minutes) | Panel 1 | Panel 2 |
| 0 | 0.76 | 0.84 |
| 15 | 1.81 | 2.15 |
| 30 | 7.82 | 7.73 |
| 45 | 8.9 | 8.15 |
| 60 | 10.47 | 10.77 |

Comparative Example 4

ABS panels were processed using a conventional Chromium (VI) etching solution instead of the aqueous, acidic ozone etching solution described above.

The ABS plastic panels were subjected to the following steps:

| Step | Time (minutes) | Temperature (° C.) |
| --- | --- | --- |
| Chromium(VI) etch | 10 | 68 |
| Reduction | 3 | 35 |
| Activation with colloidal Pd activator | 5 | 25 |
| Acceleration in an acidic accelerator solution | 3 | 40 |
| Electroless nickel (commercially available bath containing 3 g/l nickel and 20 g/l sodium hypophosphite) | 8 | 35 |
| Nickel electroplating | 5 | 55 |
| Acid copper | 50 | 25 |

Figure 3:
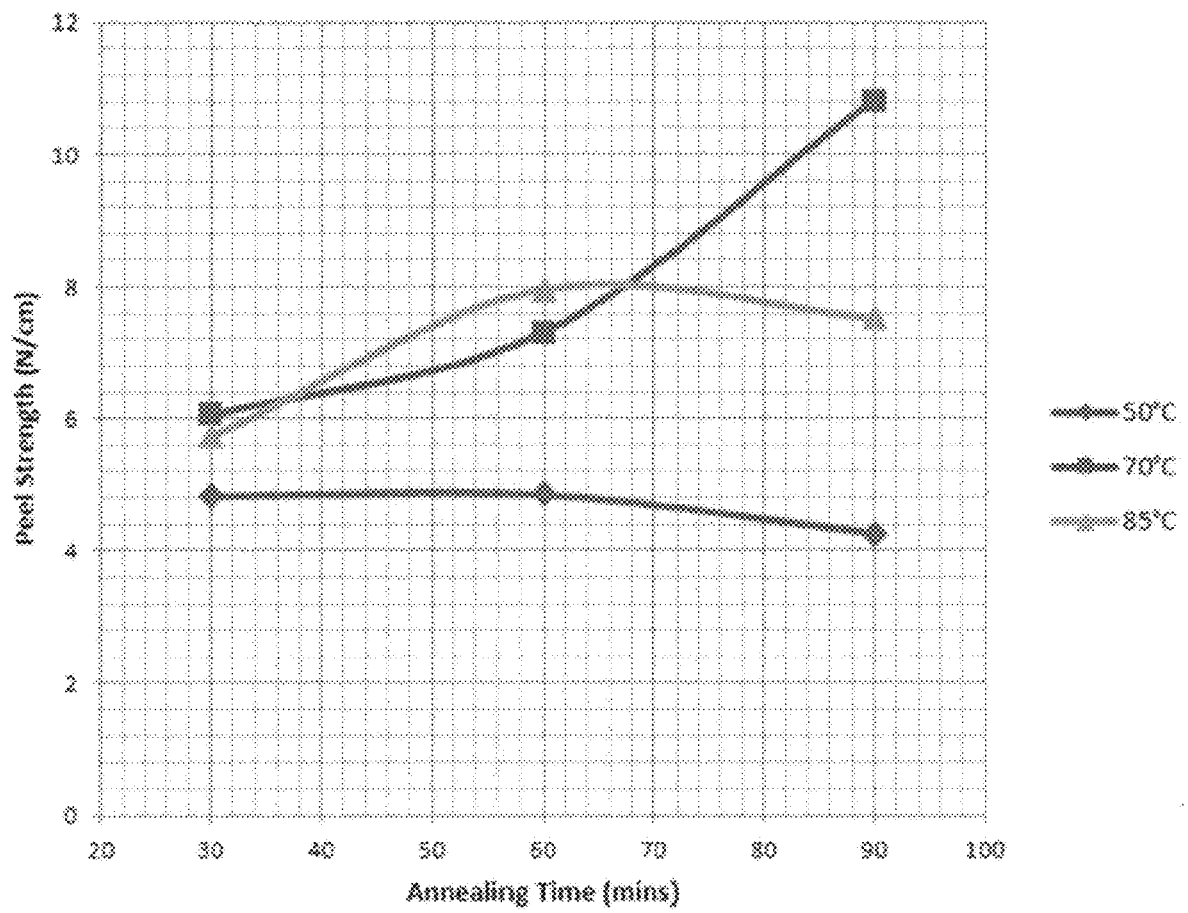
FIG. 3 depicts a graph of the adhesion strength of ABS panels with an etchant comprising chromium (VI).

The ABS surface was etched with the chromium (VI) etchant. The initial peel strength value of 6 N/cm is much higher than with the non-metallic etchant. Thereafter, the parts were placed into an oven maintained at different temperatures (50° C., 70° C., and 85° C.) for an annealing time of 30 to 90 minutes. As shown in FIG. 3, a 1.2-fold increase in peel strength was achieved as compared with the initial value in one hour at 70° C. In contrast, the initial value for ABS etched with an aqueous, acidic ozone etching solution that was subject to thermal treatment at 70° C. exhibited a much higher increase in peel strength.

This example demonstrates that the use of an aqueous, acidic ozone etching solution in combination with a heat treatment step following metallization produces an adhesion that rivals the adhesion achieved by the Chromium (VI) etchings solutions of the prior art in a much more environmentally friendly manner.

Comparative Example 5

Substitutions to various steps in the process described in Comparative Example 1 were made to determine if the optimization of other steps in the process, including variations in treating time and/or temperature and variation in process steps produce the same result as the thermal treatment step following metallization and the results are set forth in the table below.

| Modification | Time (minutes) | Adhesion (N/cm) |
|---|---|---|
| Without ozone | | No coating |
| Etch | 10 | 1.1 |
| Etch | 20 | 1.25 |
| Electroless nickel | 8 | 0.96 |
| Electroless nickel | 20 | 2.54 |
| Neutralizer | 0 | No coating |
| Neutralizer | 3 | 1.2 |
| Neutralizer | 8 | 2.4 |
| Nickel electroplating | 5 | 1.9 |
| Nickel electroplating | 10 | 1.5 |
| Neutral ammonia | | 1.2 |
| Neutral EB, Neutral alkaline | | 0.91 |
| Neutral PP | | No coating |
| With conditioner | | 3.4 |
| With protect and conditioner | | 2.2 |
| Drying | 45 | 5.34 |
| Drying | 45 | 5.4 |
| Neutralization (ammonia) | 8 | 3.7 |
| Electroless nickel | 15 | |

As seen from this example, only the combination of a thermal treatment step with the aqueous, acidic ozone etching step was able to significantly increase adhesion and thus improve peel strength. That is, it was observed that attempts to optimize other steps in the process described herein for metallizing plastic parts did not significantly improve peel strength and did not noticeably contribute to increased adhesion.

What is claimed is:

1. A method of metallizing a plastic part, the method comprising the steps of:
    a. etching a plastic part by introducing the plastic part into an aqueous, acidic ozone etching solution,
    b. metallizing the ozone-etched plastic part, and
    c. drying the ozone-etched and metallized plastic part in an oven at an elevated temperature for a period of time.

2. The method of claim 1, wherein the plastic part is selected from the group consisting of acrylonitrile butadiene styrene copolymer (ABS), acrylonitrile butadiene styrene copolymer/polycarbonate (ABS/PC), polycarbonate (PC), polyamide (PA), methacrylic butadiene styrene (MBS), polybutadiene terephthalate (PBT), styrene acrylonitrile copolymer (SAN), polypropylene sulfide (PPS), polyester (PE), polyethylene terephthalate (PET), polyether ether ketone (PEEK), polylactide (PLA), polybutylene succinate (PBS), polylactide/polybutylene succinate (PI-A/PBS), aromatic polymers (LCPs), and combinations of the foregoing.

3. The method of claim 2, wherein the plastic part comprises ABS.

4. The method of claim 2, wherein the plastic part comprises ABS/PC.

5. The method of claim 2, wherein the plastic part is a two-or three-component plastic part comprising two or more types of plastic.

6. The method of claim 1, wherein the elevated temperature is a temperature of between about 40 and about 100° C.

7. The method of claim 6, wherein the elevated temperature is a temperature of between about 70 and about 80° C.

8. The method of claim 1, wherein the period of time is between about 30 and about 90 minutes.

9. The method of claim 8, wherein the period of time is between about 45 and about 60 minutes.

10. The method of claim 1, wherein the metallization step b) comprises electroless metallization with one or more layers of nickel, copper, cobalt, copper/nickel, nickel/cobalt or gold.

11. The method of claim 10, wherein the metallization step b) comprises electroplating one or more metal layer over the one or more electroless metallization layers.

12. The method of claim 1, further comprising the step of treating the ozone-etched plastic part with a basic post-treatment solution prior to the metallization step b), optionally wherein the basic post-treatment solution is a basic ammonia-containing solution.

13. The method of claim 12, further comprising the step of activating the ozone-etched plastic part prior to the metallization step b), wherein the step of activating the ozone-etched plastic part comprises bringing the ozone-etched plastic part into contact with an activation solution.

14. The method according to claim 13, wherein the activation solution comprises an aqueous suspension of $Pd^0$ containing between about 0.001 to about 5% w/w thereof.

15. The method according to claim 13, further comprising the step of accelerating the ozone-etched plastic part after activation, wherein the step of accelerating the ozone-etched and activated plastic part comprises bringing the ozone-etched and activated plastic part into contact with an acidic accelerator solution.

16. The method of claim 1, wherein the ozone-etched and metallized plastic part exhibits a peel strength of at least about 7.0 N/cm, as measured in accordance with ASTM Test Method B533-85 (Reapproved 2019), Procedure A.

17. The method of claim 16, wherein the ozone-etched and metallized plastic part exhibits a peel strength of at least about 8.0 N/cm, as measured in accordance with ASTM Test Method B533-85 (Reapproved 2019), Procedure A.

18. The method of claim 17, wherein the ozone-etched and metallized plastic part exhibits a peel strength of at least about 9.0 N/cm, as measured in accordance with ASTM Test Method B533-85 (Reapproved 2019), Procedure A.

19. The method of claim 18, wherein the ozone-etched and metallized plastic part exhibits a peel strength of at least about 10 N/cm, as measured in accordance with ASTM Test Method B533-85 (Reapproved 2019), Procedure A.

20. A method of metallizing a plastic part, the method comprising the steps of:
    a. etching a plastic part by introducing the plastic part into an aqueous, acidic ozone etching solution;
    b. metallizing the ozone-etched plastic part; and
    c. drying the ozone-etched and metallized plastic part in an oven at a temperature of between about 40 and about 90°° C. for about 30 to about 90 minutes to increase adhesion of the metallization layers on the ozone-etched plastic part,
    wherein the ozone-etched and metallized plastic part exhibits a peel strength of at least about 8.0 N/cm, as measured in accordance with ASTM Test Method B533-85(Reapproved 2019), Procedure A.

* * * * *